US011374268B2

(12) United States Patent
Gao et al.

(10) Patent No.: US 11,374,268 B2
(45) Date of Patent: Jun. 28, 2022

(54) THIN-FILM REFERENCE ELECTRODES, ELECTROCHEMICAL DEVICES INCLUDING THIN-FILM REFERENCE ELECTRODES, AND METHODS OF MAKING THIN-FILM REFERENCE ELECTRODES

(71) Applicant: GM GLOBAL TECHNOLOGY OPERATIONS LLC, Detroit, MI (US)

(72) Inventors: Jing Gao, Rochester, MI (US); Brian J. Koch, Berkley, MI (US); Zhe Li, Rochester, MI (US); Alfred Zhang, Troy, MI (US); Gayatri V. Dadheech, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 16/577,934

(22) Filed: Sep. 20, 2019

(65) Prior Publication Data

US 2021/0091424 A1 Mar. 25, 2021

(51) Int. Cl.
*H01M 10/48* (2006.01)
*B05D 1/00* (2006.01)

(52) U.S. Cl.
CPC ............ *H01M 10/48* (2013.01); *B05D 1/005* (2013.01)

(58) Field of Classification Search
CPC .... H01M 10/48; H01M 10/38; H01M 10/058; H01M 10/04; H01M 4/0404;
(Continued)

(56) References Cited

U.S. PATENT DOCUMENTS 6,673,127 B1 1/2004 Allen et al.
10,020,456 B2 * 7/2018 Martin ................ H01L 51/0043
(Continued)

FOREIGN PATENT DOCUMENTS

CN 112542567 A 3/2021
CN 112542568 A 3/2021

OTHER PUBLICATIONS

Dadheech, Gayatri V. et al., U.S. Appl. No. 16/577,921, filed Sep. 20, 2019 entitled, "Reference Electrode Assemblies Including Thin, Porous Current Collectors and Methods of Manufacturing Thin, Porous Current Collectors," 68 pages.
(Continued)

*Primary Examiner* — Raymond Alejandro
(74) *Attorney, Agent, or Firm* — Harness, Dickey & Pierce, P.L.C.

(57) ABSTRACT

A method of making a reference electrode assembly for an electrochemical cell according to various aspects of the present disclosure includes providing a subassembly including a separator layer and a current collector layer coupled to the separator layer. The method further includes providing an electrode ink including an electroactive material, a binder, and a solvent. The method further includes creating a reference electrode precursor by applying an electroactive precursor layer to the current collector layer. The electroactive precursor layer covers greater than or equal to about 90% of a superficial surface area of a surface of the current collector layer. The electroactive precursor layer includes the electrode ink. The method further includes creating the reference electrode assembly by drying the electroactive precursor layer to remove at least a portion of the solvent, thereby forming an electroactive layer. The electroactive layer is solid and porous.

15 Claims, 9 Drawing Sheets

(58) Field of Classification Search
CPC .. H01M 4/0426; H01M 4/0419; H01M 4/045; H01M 4/139; B05D 1/005
See application file for complete search history.

(56) References Cited

U.S. PATENT DOCUMENTS

| | | | | |
|---|---|---|---|---|
| 2001/0008728 | A1 | 7/2001 | Turner et al. | |
| 2005/0079418 | A1 | 4/2005 | Kelley et al. | |
| 2018/0062221 | A1* | 3/2018 | Koch | H01M 10/48 |
| 2018/0287139 | A1* | 10/2018 | Xiao | H01M 4/134 |
| 2019/0237822 | A1 | 8/2019 | Rober et al. | |
| 2021/0091369 | A1 | 3/2021 | Dadheech et al. | |
| 2021/0167383 | A1* | 6/2021 | Nelson | C01G 53/42 |

OTHER PUBLICATIONS

BioAge Group, LLC, "Ahlstrom acquires 49% stake in US Li-ion battery separator company Porous Power Technologies." Green Car Congress, https://www.greencarcongress.com/2011/12/ahlstrom-20111212.html (Dec. 12, 2011).

Jawaharram, Gowtham Sriram, "How should I determine the various parameters for DC Magnetron Sputtering?" ResearchGate, https://www.researchgate.net/post/How-should-I-determine-the-various-parameters-for-DC-Magnetron-Sputtering (Dec. 30, 2014).

* cited by examiner

THIN-FILM REFERENCE ELECTRODES, ELECTROCHEMICAL DEVICES INCLUDING THIN-FILM REFERENCE ELECTRODES, AND METHODS OF MAKING THIN-FILM REFERENCE ELECTRODES

INTRODUCTION

This section provides background information related to the present disclosure which is not necessarily prior art.

The present disclosure relates to thin-film reference electrodes, electrochemical devices including thin-film reference electrodes, and method of making thin-film reference electrodes.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion, lithium sulfur, and lithium-lithium symmetrical batteries include a first electrode, a second electrode, an electrolyte material, and a separator. One electrode serves as a positive electrode or cathode and another serves as a negative electrode or anode. A stack of battery cells may be electrically connected to increase overall output.

Rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery. It may be desirable to perform electrochemical analysis on batteries or certain components of batteries, such as the cathode and the anode.

SUMMARY

This section provides a general summary of the disclosure, and is not a comprehensive disclosure of its full scope or all of its features.

In various aspects, the present disclosure provides a method of making a reference electrode assembly for an electrochemical cell. The method includes providing a subassembly. The subassembly includes a separator layer and a current collector layer coupled to the separator layer. The separator layer is porous and electrically insulating. The current collector layer is electrically conductive. The method further includes providing an electrode ink. The electrode ink includes an electroactive material, a binder, and a solvent. The method further includes creating a reference electrode precursor by applying an electroactive precursor layer to the current collector layer of the subassembly. The electroactive precursor layer covers greater than or equal to about 90% of a superficial surface area of a surface of the current collector layer. The electroactive precursor layer includes the electrode ink. The method further includes creating the reference electrode assembly by drying the electroactive precursor layer to remove at least a portion of the solvent, thereby forming an electroactive layer. The electroactive layer is solid and porous.

In one aspect, the creating the reference electrode precursor includes spin-coating the electrode ink onto the surface.

In one aspect, the spin-coating is performed at a rotational speed of greater than or equal to about 500 RPM to less than or equal to about 1,000 RPM.

In one aspect, the creating the reference electrode precursor includes conveying the subassembly in a direction. The creating the reference electrode precursor further includes applying the electrode ink to the surface such that the electrode ink has a first thickness. The creating the reference electrode precursor further includes forming the electroactive precursor layer by directing a fluid at the electrode ink to displace a first portion of the electrode ink. The fluid has a laminar flow. The electroactive precursor layer includes a second portion of the electrode ink and has a second thickness less than the first thickness.

In one aspect, the method further includes collecting the first portion of the electrode ink.

In one aspect, the collecting includes receiving at least a portion of the first portion of the electrode ink in an ink tray disposed on a side of the subassembly opposite the second portion of the electrode ink.

In one aspect, the collecting includes receiving at least a portion of the first portion of the electrode ink in a vacuum.

In one aspect, the applying the electrode ink includes additive manufacturing.

In one aspect, the fluid includes air.

In one aspect, the electroactive layer defines a thickness of greater than or equal to about 0.2 μm to less than or equal to about 1 μm.

In one aspect, the electroactive precursor layer covers substantially the entire superficial surface area.

In one aspect, the electroactive layer defines a first porosity of greater than or equal to about a second porosity of the separator layer.

In one aspect, the providing the subassembly includes sputtering the current collector layer onto the separator layer.

In one aspect, the current collector layer defines a thickness of greater than or equal to about 25 nm to less than or equal to about 100 nm.

In one aspect, the providing the electrode ink includes preparing the electrode ink by admixing the electroactive material, the binder, and the solvent. The solvent is present in an amount greater than or equal to about 80% by weight to less than or equal to about 99% by weight. The electroactive material is in a form of a plurality of particles.

In one aspect, the method further includes applying a mask layer to a region of the surface after providing the subassembly and prior to the creating the reference electrode precursor. The method further includes creating a tab by removing the mask layer after the creating the reference electrode precursor.

In one aspect, the method further includes creating a tab by removing a portion of the electrode ink in a region of the surface by applying a solvent to the electrode ink.

In one aspect, the solvent includes water.

In various aspects, the present disclosure provides reference electrode assembly for an electrochemical cell. The reference electrode assembly includes a separator layer, a current collector layer, and an electroactive layer. The separator layer includes an electrically-insulating material and is porous. The current collector layer is coupled to the separator layer. The current collector layer includes an electrically-conductive material. The electroactive layer includes a binder and an electroactive material. The electroactive layer covers greater than or equal to about 90% of a superficial surface area of a surface of the current collector layer. The electroactive layer defines a thickness of greater than or equal to about 0.2 μm to less than or equal to about 1 μm. The electroactive layer defines a first porosity of greater than or equal to about a second porosity of the separator layer.

In various aspects, the present disclosure provides an electrochemical cell. The electrochemical cell includes a first electrode, a first current collector, a first separator, a second electrode, a second current collector, a reference electrode assembly and an electrolyte. The first electrode includes a first electroactive material. The first current collector is coupled to the first electrode. The first separator is porous and includes a first electrically-insulating material. The second electrode includes a second electroactive material. The second current collector is coupled to the second electrode. The reference electrode assembly is disposed between the first electrode and the first separator. The reference electrode assembly includes a second separator, a third current collector, and a reference electrode. The second separator is porous and includes a second electrically-insulating material. The third current collector coupled to the second separator. The third current collector includes an electrically-conductive material. The reference electrode includes a third electroactive material. The first separator is disposed between the second electrode and the reference electrode. The electrolyte is disposed within pores of the first separator and pores of the second separator. The reference electrode covers greater than or equal to about 90% of a superficial surface area of a surface of the third current collector. The reference electrode defines a thickness of greater than or equal to about 0.2 μm to less than or equal to about 1 μm. The reference electrode defines a first porosity of greater than or equal to about a second porosity of the separator layer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6A is a top view; and FIG. 6B is a sectional view taken at line 6B-6B of FIG. 6A;

FIG. 7A is a top view; and FIG. 7B is a sectional view taken at line 7B-7B of FIG. 7A;

FIG. 8A is a top view; and FIG. 8B is a sectional view taken at line 8B-8B of FIG. 8A;

FIG. 9A is a top view; and FIG. 9B is a sectional view taken at line 9B-9B of FIG. 9A;

FIG. 12A depicts the method after depositing an electrode ink; and FIG. 12B depicts the method after spinning the electrode ink to a substantially uniform thickness;

FIG. 13A is a top view; and FIG. 13B is a sectional view taken at line 13B-13B of FIG. 13A.

Corresponding reference numerals indicate corresponding parts throughout the several views of the drawings.

DETAILED DESCRIPTION

Figure 1:
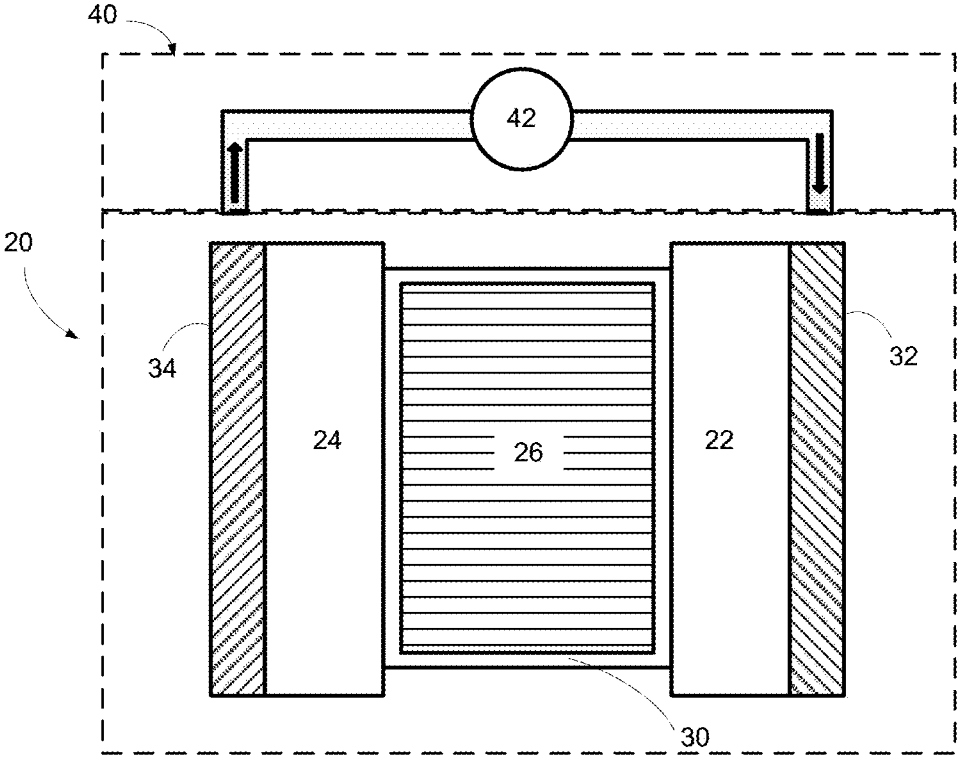
FIG. 1 is a schematic view of an electrochemical device according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

General Electrochemical Cell Function, Structure, and Composition

A typical electrochemical cell includes a first electrode, such as a positive electrode or cathode; a second electrode such as a negative electrode or an anode; an electrolyte; and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery, and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides, as is known in the art. In certain aspects, the current collectors may be coated with an electroactive layer on both sides. The negative electrode current collector 32 and positive electrode current collector 34 respectively collect and move free electrons to and from an external circuit 40. The interruptible external circuit 40 includes a load device 42 that connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Non-limiting examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis (trifluoromethanesulfonimide) (LITF ($LiN(CF_3SO_2)_2$); lithium fluorosulfonylimide ($LiN(FSO_2)_2$) (LIFSI); and combinations thereof. In certain variations, the electrolyte 30 may include a 1 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol) dimethyl ether), 1,3-dimethoxypropane (DMP), and combinations thereof. Carbonate-based solvents may include various alkyl carbonates, such as cyclic carbonates (e.g., ethylene carbonate, propylene carbonate, butylene carbonate) and acyclic carbonates (e.g., dimethyl carbonate, diethyl carbonate, ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various aspects, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Where the electrolyte is a solid state electrolyte, it may include a composition selected from the group consisting of: $LiTi_2(PO_4)_3$, $LiGe_2(PO_4)_3$, $Li_7La_3Zr_2O_{12}$, $Li_3xLa_{2/3}\text{-}xTiO_3$, $Li_3PO_4$, $Li_3N$, $Li_4GeS_4$, $Li_{10}GeP_2S_{12}$, $L_{12}S—P_2S_5$, $Li_6PS_5Cl$, $Li_6PS_5Br$, $Li_6PS_5I$, $Li_3OCl$, $Li_{2.99}Ba_{0.005}ClO$, or any combination thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

Solid-State Electrolyte

In various aspects, the porous separator 26 and the electrolyte 30 may be replaced with a solid state electrolyte (SSE) that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of non-limiting example, SSEs may include $LiTi_2(PO_4)_3$, $Li_{1.3}Al_{0.3}Ti_{1.7}(PO_4)_3$ (LATP), $LiGe_2(PO_4)_3$, $Li_7La_3Zr_2O_{12}$, $Li_3xLa_{2/3}\text{-}xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}\ Ba_{0.005}ClO$, or combinations thereof.

Positive Electrode

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

Two exemplary common classes of known electroactive materials that can be used to form the positive electrode 24 are lithium transition metal oxides with layered structures and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically <0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide (Li $(Ni_xMn_yCo_z)O_2)$, where $0 \le x \le 1$, $0 \le y \le 1$, $0 \le z \le 1$, and $x+y+z=1$ (e.g., $LiNi_{0.6}Mn_{0.2}Co_{0.2}O_2$, $LiNi_{0.8}Mn_{0.1}Co_{0.1}O_2$, and/or $LiMn_{0.33}Ni_{0.33}Co_{0.33}O_2$), a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such as lithium manganese oxide ($Li_{(1+x)}Mn_{(2-x)}O_4$), a mixed lithium manganese nickel oxide ($LiMn_{(2-x)}Ni_xO_4$), where $0 \le x \le 1$, and/or a lithium manganese nickel cobalt oxide (e.g., $LiNi_{0.6}Mn_{0.2}Co_{0.2}O_2$, $LiNi_{0.8}Mn_{0.1}Co_{0.01}O_2$, and/or $LiMn_{0.33}Ni_{0.33}Co_{0.33}O_2$). In a lithium-sulfur battery, positive electrodes may have elemental sulfur as the active material or a sulfur-containing active material.

The positive electroactive materials may be powder compositions. The positive electroactive materials may be intermingled with an optional electrically conductive material (e.g., electrically-conductive particles) and a polymeric binder. The binder may both hold together the positive electroactive material and provide ionic conductivity to the positive electrode 24. The polymeric binder may include polyvinylidene fluoride (PVdF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, or a combination thereof.

The positive electroactive material loading in the binder can be large, such as greater than about 80% by weight. For example, the binder can be present at a level of greater than or equal to about 1% by weight to less than or equal to about 20% by weight, optionally greater than or equal to about 1% by weight to less than or equal to about 10% by weight, optionally greater than or equal to about 1% to less than or equal to about 8% by weight, optionally greater than or equal to about 1% by weight to less than or equal to about 6% by weight, optionally greater than or equal to about 1% by weight to less than or equal to about 7% by weight, optionally greater than or equal to about 1% by weight to less than or equal to about 5% by weight, or optionally greater than or equal to about 1% by weight to less than or equal to about 3% by weight.

Electrically conductive materials may include graphite, other carbon-based materials, conductive metals, or conductive polymer particles. Carbon-based materials may include, by way of non-limiting example, particles of KETJEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15% by weight, optionally less than or equal to about 10% by weight, or optionally greater than or equal to about 0.5% by weight to less than or equal to about 8% by weight. While the supplemental electrically conductive compositions may be described as powders, these materials lose their powder character following incorporation into the electrode where the associated particles of the supplemental electrically conductive material become a component of the resulting electrode structure.

Negative Electrode

The negative electrode 22 may include a negative electroactive material as a lithium host material capable of functioning as a negative terminal of the lithium-ion battery 20. Common negative electroactive materials include lithium insertion materials or alloy host materials. Such materials can include carbon-based materials, such as lithium-graphite intercalation compounds, lithium-silicon compounds, lithium-tin alloys, or lithium titanate $Li_{4+x}Ti_5O_{12}$, where $0 \le x \le 3$, such as $Li_4Ti_5O_{12}$ (LTO).

In certain aspects, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material selected from the group consisting of: polyvinylidene difluoride (PVdF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETJEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode 22 may include about 50-100% by weight of an electroactive material (e.g., lithium particles or a lithium foil), optionally greater than or equal to about 30% by weight of an electrically conductive material, and a balance binder.

Electrode Fabrication

In various aspects, the negative and positive electrodes 22, 24 may be fabricated by mixing the respective electroactive material into a slurry with a polymeric binder compound, a non-aqueous solvent, optionally a plasticizer, and optionally if necessary, electrically conductive particles. The slurry can be mixed or agitated, and then thinly applied to a substrate via a doctor blade and/or slot die coating. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calender it. In other variations, the film may be dried at moderate temperature to form self-supporting films. If the substrate is removable, then it is removed from the electrode film that is then further laminated to a current collector. With either type of substrate, the remaining plasticizer may be extracted prior to incorporation into the battery cell. In various aspects, a solid electrode may be formed according to alternative fabrication methods.

Optional Electrode Surface Coatings

In certain variations, pre-fabricated negative electrodes 22 and positive electrodes 24 formed via the active material slurry casting described above can be directly coated via a vapor coating formation process to form a conformal inorganic-organic composite surface coating, as described further below. Thus, one or more exposed regions of the pre-fabricated negative electrodes including the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles including an electroactive material, like lithium metal, can be coated with an inorganic-organic composite surface coating. Then, the coated electroactive particles can be used in the active material slurry to form the negative electrode, as described above.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of non-limiting example, electrically-conductive materials include copper, nickel, aluminum, stainless steel, titanium, gold, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Analysis of Electrochemical Cells

It may be desirable to perform electrochemical analysis on electrodes. Electrochemical analysis may produce calibrations for control systems in HEVs and EVs pertaining to fast charge, lithium plating, state of charge, and power estimation, for example. The electrodes may be analyzed by providing a reference electrode in an electrochemical cell including positive and negative electrodes. The reference electrode enables monitoring of individual positive and negative electrode potentials as the cell is being cycled. Potentials may be monitored in a lab setting or during real-time use of a system including the electrochemical cell. For example, potentials may be detected during operation of a vehicle, as part of regular vehicle diagnostics. Detected potentials can be used in vehicle control algorithms to improve cell performance, such as by raising anode potential to decrease lithium plating.

Some reference electrodes are nonporous and may therefore create a "shadow effect" during cell cycling by blocking ion transport in the region of the reference electrode, thereby inhibiting cell performance. Another type of reference electrode, which may be referred to as a "dot-like reference electrode," is porous and relatively small. Electrochemical cells including dot-like reference electrodes may suffer from reduced cycle life and uneven current distribution, resulting in possible cell damage, such as lithium plating.

In various aspects, the present disclosure provides a reference electrode assembly and electrochemical devices including the reference electrode assembly. The reference electrode assembly generally includes a separator layer, a current collector layer, and an electroactive layer. The electroactive layer is thin, porous, and may occupy greater than or equal to about 90% of a superficial surface area of the current collector, such as substantially the entire superficial surface area, in certain aspects. Reference electrode assemblies in accordance with the present disclosure may enable accurate measurements of individual potentials within an electrochemical cell with minimal influence to operation of the cell. More particularly, during operation of the cell, the porosity facilitates even current distribution, minimizes ion flux, and minimizes resistance of the cell. Accurate measurements by the electrochemical layer of the electrochemical cell may be used in vehicle control algorithms to facilitate fast charge with anode-potential-control charge protocol; reduce or prevent lithium plating, such as in regenerative braking; perform on-vehicle battery aging diagnostics, such as based on individual positive and negative electrode profiles; perform state-of-charge estimates, such as in silicon cells based on positive electrode potential; and/or perform on-vehicle electrochemical cell diagnostics.

In various aspects, the present disclosure provides methods of manufacturing a reference electrode assembly and an electrochemical device including the reference electrode assembly. The method of manufacturing the reference electrode assembly may include forming the electroactive layer by laminar air flow (FIG. 11) or spin coating (FIGS. 12A-12B), as described in greater detail below. Electroactive layers formed in accordance with the present disclosure may have a large interface area with the current collector layer and therefore a strong adhesion to the current collector layer, yielding longer product life than other reference electrodes. The above methods may facilitate the formation of thin-film electroactive layers that have a substantially uniform thickness. Furthermore, the electroactive layers can be formed to be porous.

Figure 2:
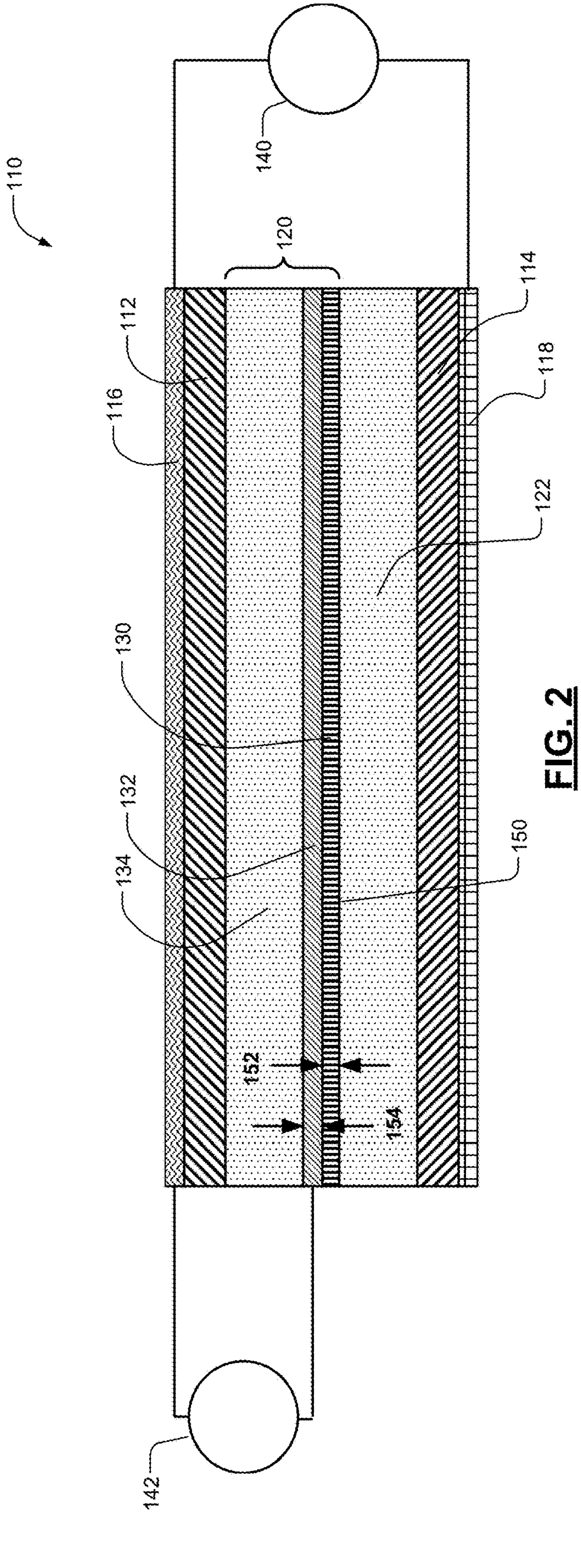
FIG. 2 is a schematic view of an electrochemical device including a reference electrode assembly according to various aspects of the present disclosure.

With reference to FIG. 2, an electrochemical device 110 according to various aspects of the present disclosure is provided. The electrochemical device 110 includes a negative electrode 112 and a positive electrode 114. The negative electrode 112 is coupled to a negative electrode current collector 116. The positive electrode 114 is electrically connected to a positive electrode current collector 118.

A reference electrode assembly 120 and a separator component 122 are disposed between the negative and positive electrodes 112, 114. The negative and positive electrodes 112, 114, the reference electrode assembly 120, and the separator component 122 may be imbibed with an electrolyte (not shown). The separator component 122 may be disposed between the positive electrode 114 and the reference electrode assembly 120.

The reference electrode assembly 120 may include an electroactive layer or reference electrode 130, a current collector layer or reference electrode current collector 132, and a separator layer or reference electrode separator 134. The current collector layer 132 may be disposed between the electroactive layer 130 and the separator layer 134 such that it is in electrical communication with the electroactive layer 130. The reference electrode assembly 120 may be oriented in the electrochemical device 110 such that the separator layer 134 is disposed adjacent to the negative electrode 112 and the electroactive layer 130 is disposed adjacent to the separator component 122. In various alternative aspects, an electrochemical device may be arranged such a separator layer is disposed adjacent to a positive electrode and an electroactive layer is disposed adjacent to a separator component.

A first measurement device, such as a first voltage meter 140 may be electrically connected to the negative and positive electrodes 112, 114 via the negative and positive electrode current collectors 116, 118 to detect a potential between the negative and positive electrodes 112, 114. A second measurement device, such as a second voltage meter 142 may be electrically connected to the negative electrode 112 and the reference electrode 130 via the negative and reference electrode current collectors 116, 132 to detect a potential difference between the negative electrode 112 and the reference electrode 130. Because characteristics of the reference electrode 130 are known, the measurement by the second voltage meter 142 ultimately provides individual potential of the negative electrode 112. Individual potential of the positive electrode 114 can be determined from the above measurements.

The reference electrode assembly 120 is porous such that ions can pass through the reference electrode assembly 120 during cycling of the electrochemical device 110. In certain aspects, the reference electrode assembly 120 may have a total porosity of greater than or equal to about 30%, optionally greater than or equal to about 40%, optionally greater than or equal to about 50%, optionally greater than or equal to about 60%, or optionally greater than or equal to about 70%. For example, the total porosity may be greater than or equal to about 40% to less than or equal to about 80%. In certain aspects, a first porosity of the electroactive layer 130 may be greater than or equal to a second porosity of the separator layer 134 so that it does not create an additional barrier to ion flux beyond that of the separator layer 134. For example, the first porosity may be greater than or equal to about 40%, optionally greater than or equal to about 50%, optionally greater than or equal to about 60%, optionally greater than or equal to about 70%, or optionally greater than or equal to about 80%. In certain aspects, the first porosity may be less than or equal to about 80%, optionally less than or equal to about 70%, or optionally less than or equal to about 60%. For example, the first porosity may be greater than or equal to about 40% to less than or equal to about 80%.

The electroactive layer 130 may cover a substantial portion of a superficial surface area of a surface 150 of the current collector layer 132. In certain aspects, the electroactive layer 130 may cover greater than or equal to about 70%, optionally greater than or equal to about 75%, optionally greater than or equal to about 80%, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, or optionally greater than or equal to about 99% of the superficial surface area of the surface 150 of the current collector layer 132. In certain aspects, the electroactive layer 130 may cover substantially the entire superficial surface area of the surface 150.

The electroactive layer 130 may be fabricated as a thin film. In certain aspects, the electroactive layer 130 may define a first thickness 152 of less than or equal to about 5 μm, optionally less than or equal to about 1 μm, or optionally less than or equal to about 0.5 μm. In certain aspects, the first thickness 152 may be greater than or equal to about 0.2 μm. For example, the first thickness 152 may be greater than or equal to about 0.2 μm to less than or equal to about 1 μm. In certain aspects, the electroactive layer 130 formed in accordance with the methods herein may have a substantially uniform thickness. For example, a variation in thickness of the electroactive layer 130 may be less than or equal to about 0.5 μm.

The electroactive layer 130 may include a plurality of electroactive material particles, a binder, and optionally, a conductive additive. The plurality of electroactive material particles may have diameters of greater than or equal to about 10% of the first thickness 152 of the electroactive layer 130 to less than or equal to about 100% of the first thickness 152 of the electroactive layer 130. The electroactive material may include a material having a constant or substantially constant voltage regardless of state of charge. In certain aspects, the electroactive material may include iron phosphate, lithium titanate, lithium aluminum, or a metal oxide, or combinations thereof, by way of non-limiting example.

The binder and the conductive additive may be formed from materials such as those described above in conjunction with the negative and positive electrodes 22, 24 of FIG. 1. In certain aspects, the binder may be a water-soluble binder, such as carboxymethyl cellulose (CMC), polyvinyl alcohol, or combinations thereof, by way of non-limiting example. The current collector layer 132 may be formed from an electrically-conductive material, such as those described above with respect to the negative and positive electrode current collectors 32, 34 of FIG. 1, by way of non-limiting example. In certain aspects, the current collector layer 132 may comprise gold. The current collector layer 132 has a second thickness 154. In certain aspects, the second thickness may be greater than or equal to about 25 nm to less than or equal to about 100 nm, optionally greater than or equal to about 40 nm to less than or equal to about 60 nm, or optionally about 50 nm.

The separator layer 134 is ionically conductive and electrically insulating. The separator layer 134 may include a microporous membrane, such as those described above with respect to the separator 26 of FIG. 1. In certain aspects, the separator layer 134 may include a ceramic material for mechanical support.

Figure 3:
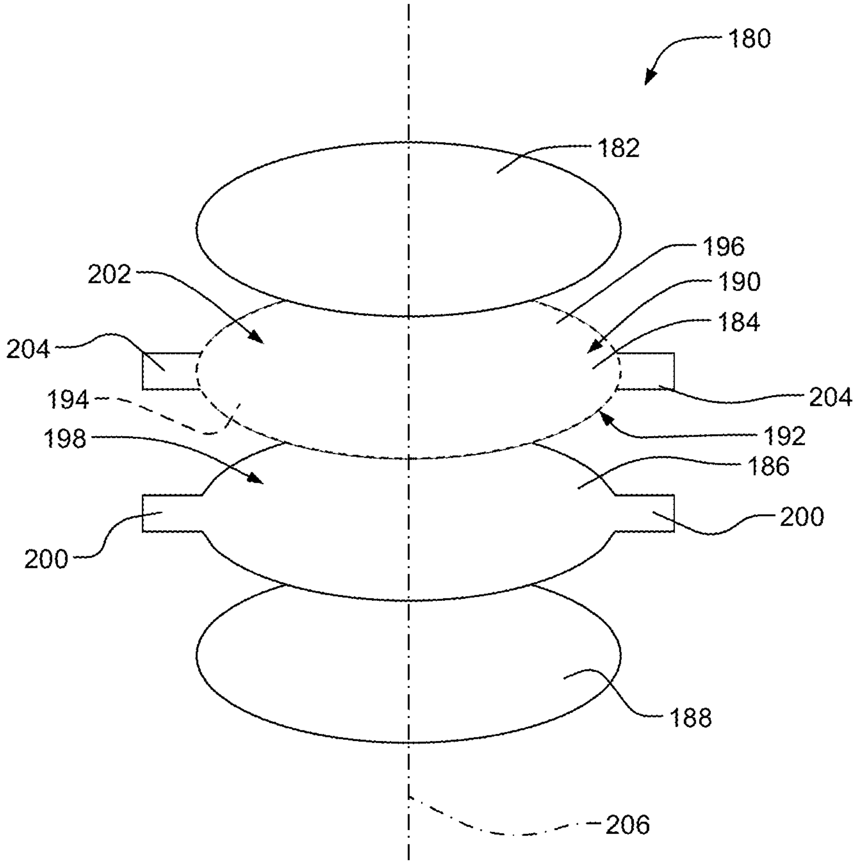
FIG. 3 is an exploded view of an electrode stack for a coin cell according to various aspects of the present disclosure.

A reference electrode assembly in accordance with present disclosure may have a variety of shapes and sizes. Moreover, the reference electrode assembly may be used in a various configurations and types of electrochemical devices. Referring to FIG. 3, an electrode stack 180 for a coin cell according to various aspects of the present disclosure is provided. The electrode stack 180 may generally include a negative electrode 182, a reference electrode assembly 184, a separator component 186, and a positive electrode 188, similar to those described above with respect to FIG. 2.

The reference electrode assembly 184 may be disposed between the negative electrode 182 and the separator component 186. The separator component 186 may be disposed between the reference electrode assembly 184 and the positive electrode 188. The reference electrode assembly 184 may extend between a first side 190 and a second side 192. The reference electrode assembly may include an electroactive layer 194, a separator layer 196, and a current collector layer (not shown). The separator layer 196 is disposed on the first side 190. The electroactive layer 194 is disposed on the second side 192. The current collector layer is disposed between the electroactive layer 194 and the separator layer 196.

In certain aspects, the negative and positive electrodes 182, 188 may be substantially circular. The separator component 186 may include a first substantially circular portion 198 and at least one first tab 200. In certain aspects, the at least one first tab 200 may be a pair of diametrically-opposed tabs, as shown.

The reference electrode assembly 184 may include a second substantially circular portion 202 and at least one second tab 204. In certain aspects, the at least one second tab 204 may include a pair of diametrically-opposed tabs. The second tabs 204 may be substantially free of the electroactive layer 194. Accordingly, the second tabs 204 may include the separator layer 196 and the current collector layer. When the electrode stack 180 is assembled into the coin cell, the first and second tabs 200, 204 are substantially aligned.

The negative electrode 182, the reference electrode assembly 184, the separator component 186, and the positive electrode 188 may have centers that are substantially aligned along a longitudinal axis 206. In certain aspects, the electrode stack 180 may be used in a three-electrode fixture (along with other components described above, such as an electrolyte), such as the fixture discussed in U.S. patent application Ser. No. 15/885,318 (Filing Date: Jan. 31, 2018; Title: "Three-Electrode Device For Performing Electrochemical Analysis On Lithium Ion Batteries"; Inventors: Kevin B. Rober, Brain J. Koch, and Robert S. Conell), herein incorporated by reference in its entirety. In certain other aspects, the electrode stack 180 may be used in an electrochemical device on a vehicle, for example.

Figure 4:
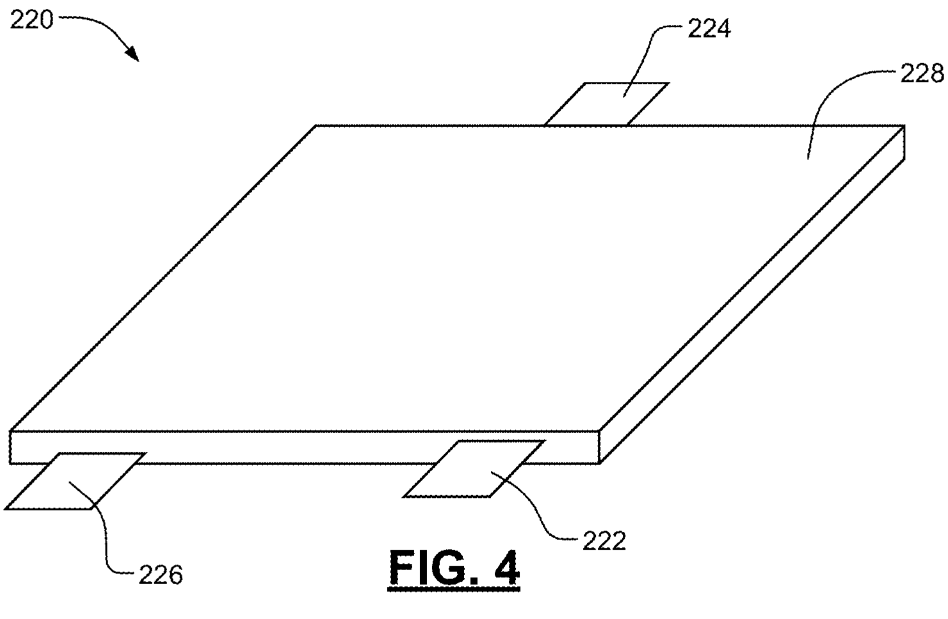
FIG. 4 is a perspective view of a pouch cell according to various aspects of the present disclosure.

With reference to FIG. 4, a three-electrode pouch cell 220 according to various aspects of the present disclosure is provided. The three-electrode pouch cell 220 includes an electrode stack. The electrode stack may generally include a negative electrode including a negative electrode tab 222, a reference electrode assembly including a reference electrode tab 224, a separator component (not shown), and a positive electrode including a positive electrode tab 226. The negative electrode, reference electrode assembly, separator, and positive electrode may be similar to the negative electrode 112, reference electrode assembly 120, separator component 122, and positive electrode 114 described in conjunction with FIG. 2. The electrode stack may include other components described above, such as an electrolyte, and be disposed within an electrically-insulating housing 228.

Figure 5:
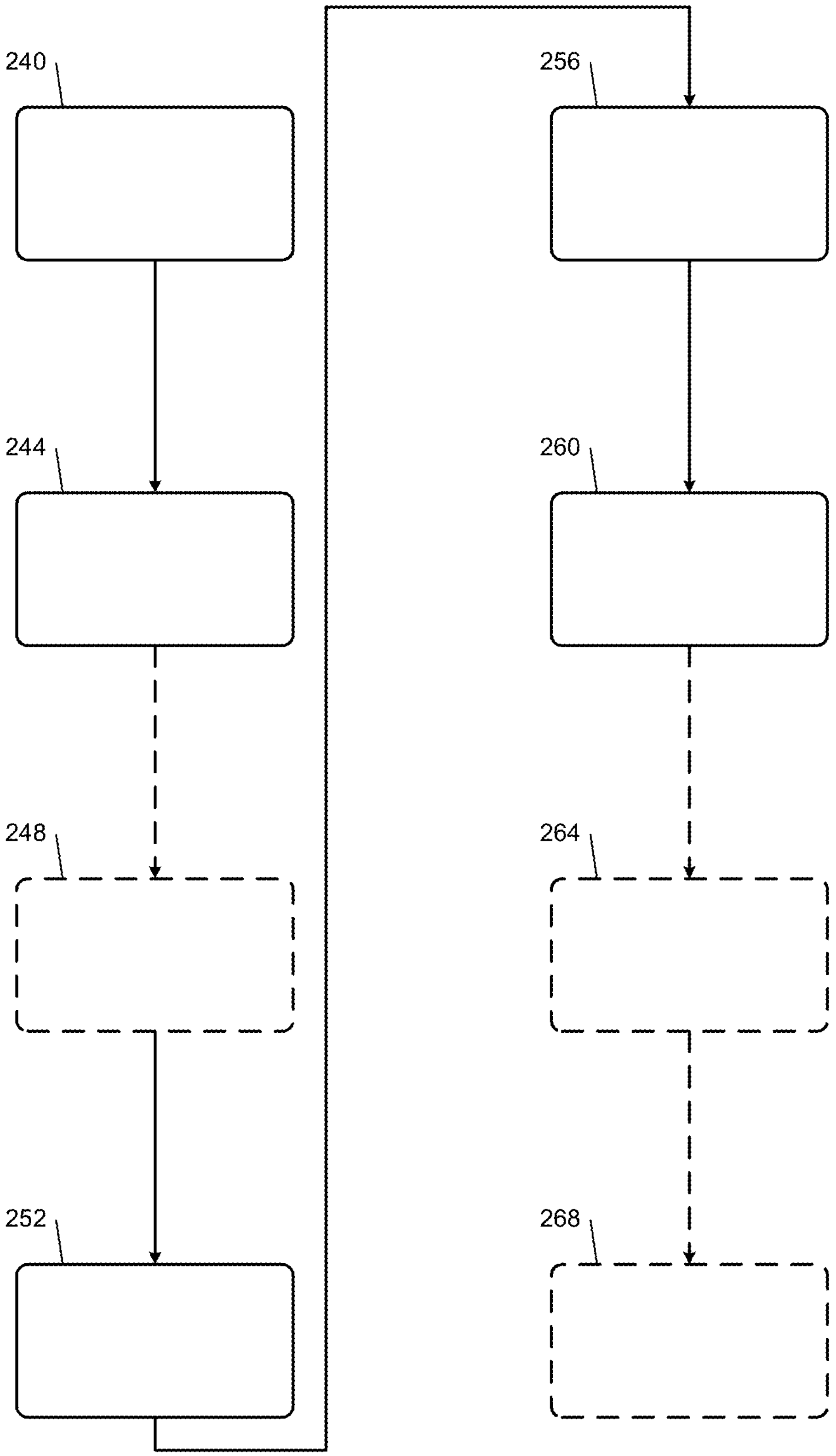
FIG. 5 is a flowchart depicting a method of manufacturing an electrochemical device, the method including manufacturing a reference electrode assembly according to various aspects of the present disclosure.

Referring to FIG. 5, a flowchart depicting a method of manufacturing a three-electrode electrochemical device, including manufacturing a reference electrode assembly, according to various aspects of the present disclosure is provided. The method of manufacturing the reference electrode assembly generally includes providing a subassembly at 240, providing an electrode ink at 244, optionally applying a mask to the subassembly at 248, creating a reference electrode precursor at 252, creating a reference electrode assembly at 256, and removing a portion of an electroactive layer at 260. In certain aspects, the method may optionally include subdividing the electrode assembly at 264. In certain aspects, the reference electrode assembly may be assembled into a three electrode cell at 268. Each of the above steps is described in greater detail below.

Providing a Subassembly

At 240, the method includes providing a subassembly including a separator layer and a current collector layer. In certain aspects, the subassembly is provided with the current collector layer being coupled to the separator layer. In certain other aspects, providing the subassembly includes forming the subassembly.

Figure 6A:
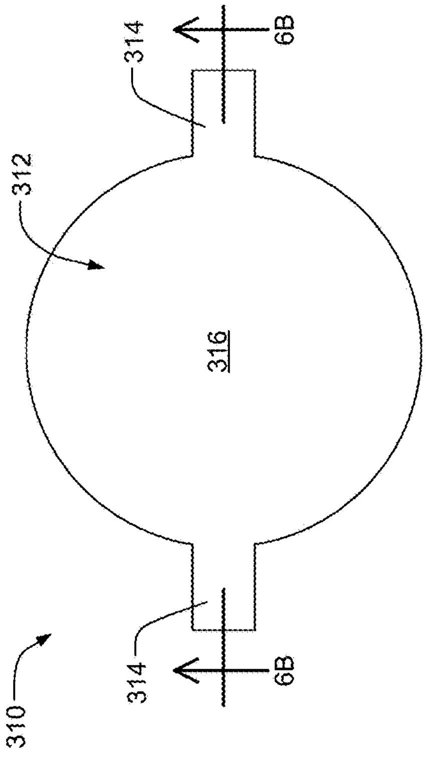
FIGS. 6A-6B depict a separator layer according to various aspects of the present disclosure.
Figure 6B:
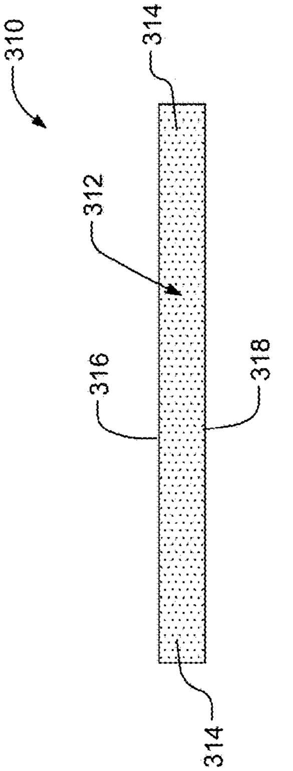

With reference to FIGS. 6A-6B, a separator layer 310 according to various aspects of the present disclosure is provided. The separator layer 310 may be similar to the separator layer 134 of FIG. 2. The separator layer 310 may include a substantially circular portion 312 and a pair of tabs 314. The separator layer 310 may include a first surface 316 and a second surface 318 disposed opposite the first surface 316.

Figure 7A:
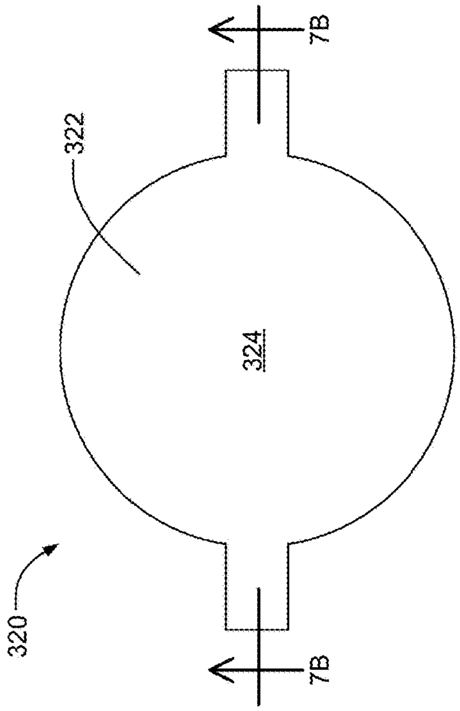
FIGS. 7A-7B depict a subassembly including the separator layer of FIGS. 6A-6B and a current collector layer.
Figure 7B:
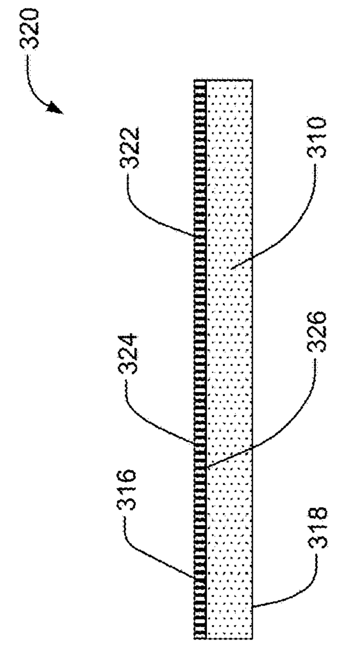

Referring to FIGS. 7A-7B, a subassembly 320 may be formed by applying a current collector layer 322 to the separator layer 310. The current collector layer 322 may be similar to the current collector layer 132 of FIG. 2. The current collector layer 322 includes a third surface 324 and a fourth surface 326 opposite the third surface 324. The fourth surface 326 of the current collector layer 322 may be in direct contact with the first surface 316 of the separator layer 310. The current collector layer 322 may be applied to the first surface 316 of the separator layer 310 by sputtering, by way of example. In certain aspects, the current collector layer 322 may cover greater than or equal to about 95% of a superficial surface area of the first surface 316, or optionally substantially an entire superficial surface area of the first surface 316.

Providing an Electrode Ink

Returning to FIG. 5, at 244, the method includes providing an electrode ink. Step 244 may be performed after step 240, concurrently with step 240, or before step 240. The electrode ink may include a plurality of electroactive material particles, a binder, optionally an electrically-conductive additive, and a solvent. The electroactive material particles, binder, and electrically-conductive additive may be similar to those described in conjunction with the electroactive layer 130 of FIG. 2. The solvent may include water, an alcohol, N-methyl-2-pyrrolidone (NMP), or combinations thereof, by way of non-limiting example.

In certain aspects, providing the electrode ink may include preparing the electrode ink. The electrode ink may be prepared by admixing the plurality of electroactive material particles, the binder, the solvent, and optionally the electrically-conductive additive. The solvent may be present in amount greater than or equal to about 80% by weight to less than or equal to about 99% by weight of the admixture.

The amount of solvent may be altered to achieve a desired electrode ink viscosity. It is believed that a weight percentage of solvent may be varied to improve ease of manufacturing and/or properties of the electroactive material layer to be formed. For example, a weight percentage of solvent in the electrode ink may be directly proportional to a porosity of a formed electroactive layer such that increasing a weight percentage of the solvent increases the porosity. The weight percentage of solvent may therefore be indirectly proportional to a capacity of the resulting reference electrode. In another example, a weight percentage of solvent in the electrode ink may be indirectly proportional to a thickness of the electroactive material layer such that increasing a weight percentage of solvent decreases the thickness.

Applying a Mask to the Subassembly

Figure 8B:
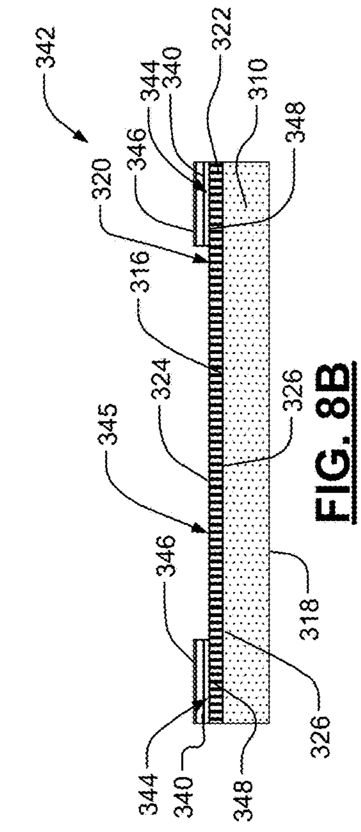
FIGS. 8A-8B depict a masked subassembly including the subassembly of FIGS. 7A-7B and a mask layer.
Figure 8A:
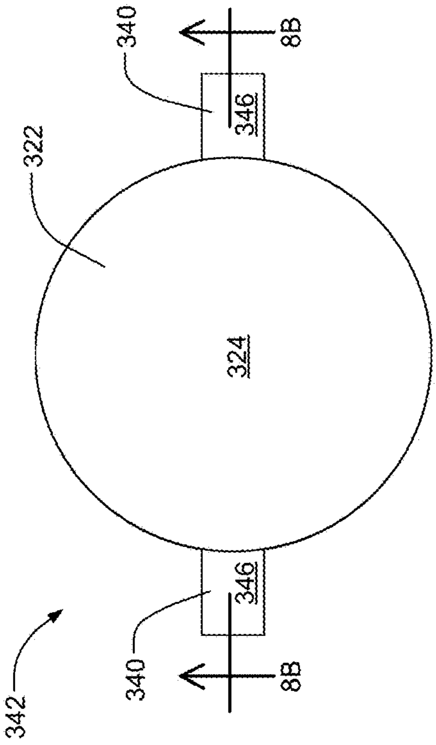

At 248, the method may optionally include applying a mask to the subassembly to create a masked subassembly. Step 248 may be omitted when the method includes step 260, for example. With reference to FIGS. 8A-8B, a mask layer or protective film 340, which may include one or more distinct portions, may be applied to the subassembly 320 to form a masked subassembly 342. The mask layer 340 may cover a first region 344 of the third surface 324 of the current collector layer 322 corresponding to the tabs 314. A second region 345 of the third surface 324 of the current collector layer 322 may be free of the mask layer 340. The mask layer 340 may protect the first region 344 of the current collector layer 322 by blocking the subsequent application of an electroactive layer, thereby leaving the first regions 344 of the current collector layer 322 exposed.

The mask layer 340 may be coupled to the current collector layer 322. The mask layer 340 may have a fifth surface 346 and a sixth surface 348 disposed opposite the fifth surface 346. The sixth surface 348 is coupled to the third surface 324 of the current collector portion. In certain aspects, the mask layer 340 may be removably adhered to the current collector layer 322 (i.e., such that the mask layer 340 remains in place during application of the electrode ink, but are subsequently removable without damaging the current collector layer 322. The mask layer 340 may be releasably coupled to the separator layer 350 by gravity, magnets, clamps, or a temporary adhesive (e.g., silicone- or acrylate-based adhesives), by way of example. The mask layer 340 may be substantially nonporous. In certain aspects, the mask layer 340 may include a metal (e.g., stainless steel, brass), a plastic (e.g., polytetrafluoroethylene (PTFE)), cellulose (e.g., paper, cardstock), or a water-soluble composition. A metal mask layer may be photo etched. A plastic mask layer may be a laser-cut, die-cut, or CNC-cut plastic film.

Creating a Reference Electrode Precursor

Figure 9B:
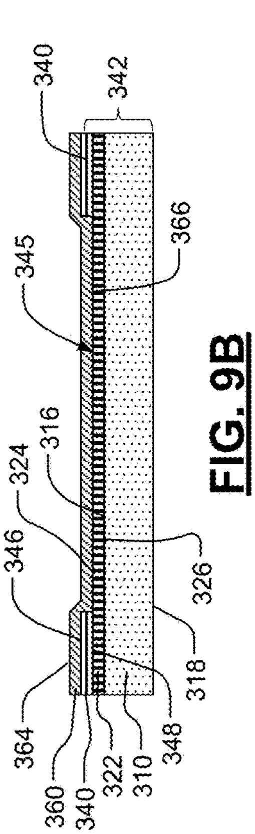
FIGS. 9A-9B depict a reference electrode precursor including the masked subassembly of FIGS. 8A-8B and an electrode ink layer.
Figure 9A:
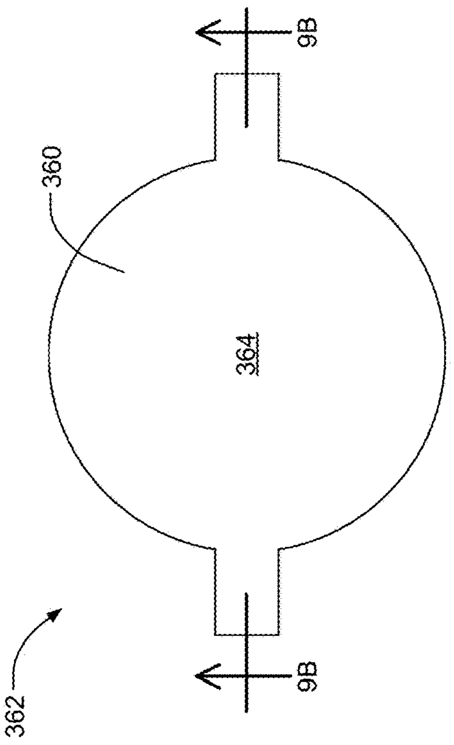

Returning to FIG. 5, at 252, the method includes creating a reference electrode precursor by applying an electrode ink to the subassembly 320 of FIGS. 7A-7B or the masked subassembly 342 of FIGS. 8A-8B. With reference to FIGS. 9A-9B, creating an electrode precursor may include applying an electrode ink layer 360 to the masked subassembly 342 to form a reference electrode precursor 362. The electrode ink layer 360 may extend over the second region 345 of the third surface 324 of the current collector layer 322 and the fifth surface 346 of the mask layer 340. The electrode ink layer 360 may include a seventh surface 364 and an eighth surface 366 opposite the seventh surface 364.

Figure 10:
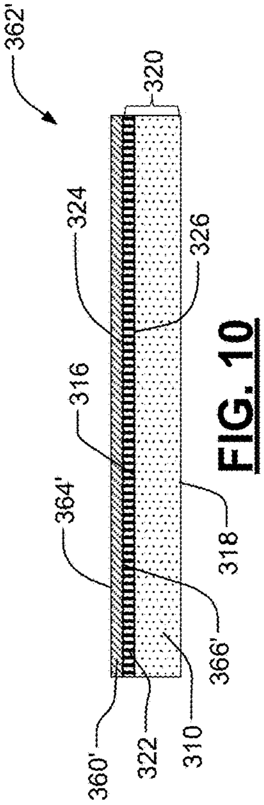
FIG. 10 is a sectional view of another reference electrode precursor including the subassembly of FIGS. 7A-7B and an electrode ink layer.

Referring to FIG. 10, creating a reference electrode precursor may alternatively include applying an electrode ink layer 360' to the subassembly 320 to form an electrode precursor 362'. The electrode ink layer 360' may extend over the third surface 324 of the current collector layer 322. In certain aspects, such as when the method includes step 260 (FIG. 5), the electrode ink layer 360' may be applied to substantially the entire third surface 324 such that it covers substantially all of a superficial surface area of the third surface 324. The electrode ink layer 360' may include a seventh surface 364' and an eighth surface 366' opposite the seventh surface 364'.

(a) Creating a Reference Electrode Precursor Via Laminar Air Flow

Figure 11:
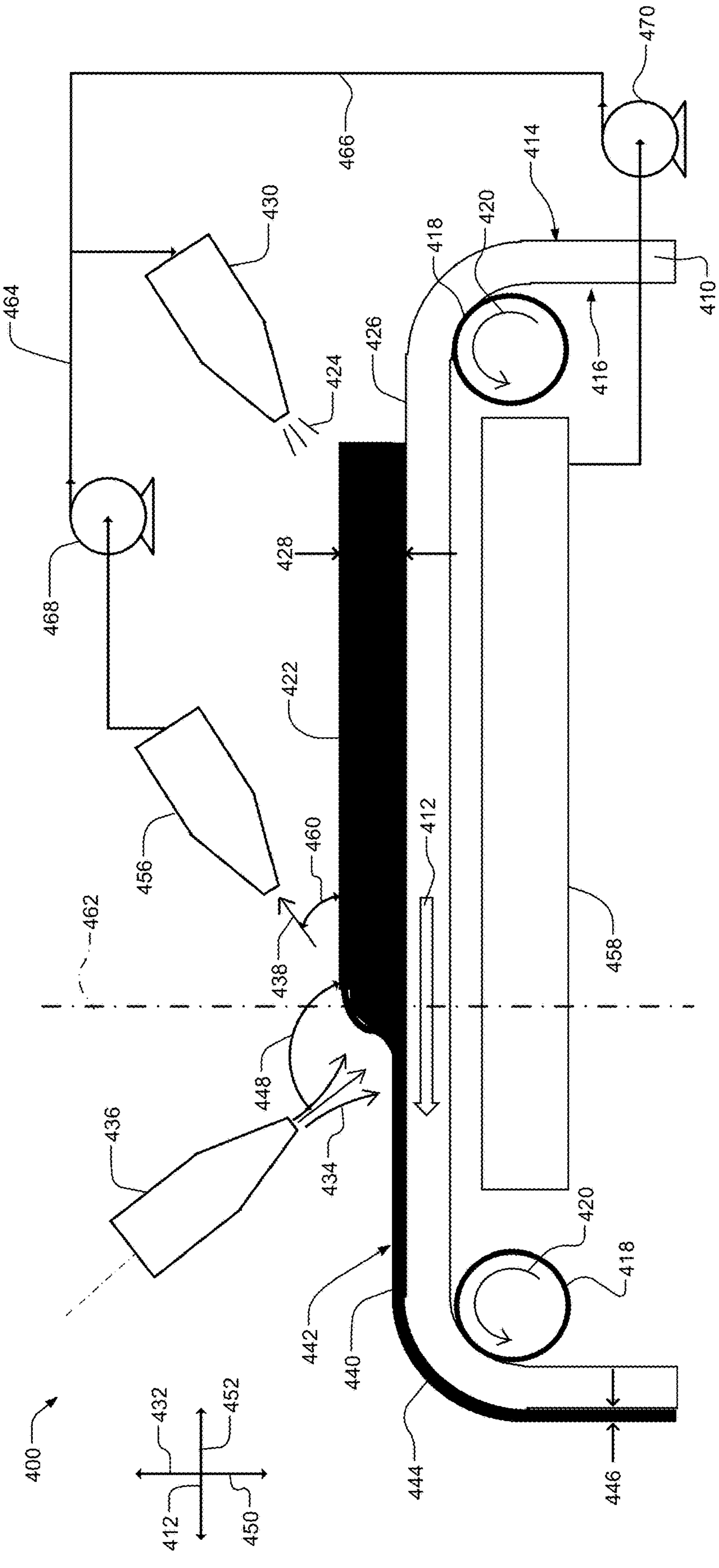
FIG. 11 is a schematic view of a method of making a reference electrode assembly using laminar airflow.

In certain aspects, forming a reference electrode precursor, such as the reference electrode precursor 362 of FIGS. 9A-9B or the reference electrode precursor 362' of FIG. 10, may include a laminar airflow method. With reference to FIG. 11, a system 400 for forming a reference electrode precursor via laminar air flow according to various aspects of the present disclosure is provided.

The method may include conveying a subassembly sheet 410 in a first or conveyance direction 412. The subassembly sheet 410 may include a current collector layer disposed on a first or working side 414 and a separator layer disposed on a second or backing side 416. One or more rollers 418 may rotate in a rotational direction 420 to convey the subassembly sheet 410 in the conveyance direction 412.

The method may further include applying a pre-layer 422 of electrode ink 424 to a surface 426 of the working side 414 such that the pre-layer 422 has an initial thickness 428. The electrode ink 424 may be applied as a liquid. When the electrode ink 424 has the initial thickness 428, it may be referred to as being in a "flooded" state. Prior to being applied to the surface 426, the electrode ink 424 may be stored in an ink dispenser 430. The ink dispenser 430 may be disposed in a second or upward direction 432 with respect to the subassembly sheet 410. In certain aspects, the upward direction 432 may be substantially perpendicular to the conveyance direction 412. The electrode ink 424 may be applied by the ink dispenser 430, such as in an additive manufacturing process. In certain aspects, the electrode ink 424 may be applied by a sprayer, a syringe, a nozzle, or a container with a dispensing valve, by way of example.

The method may further include directing a fluid 434 from a blower 436 toward the pre-layer 422 to displace a first portion 438 of the electrode ink 424. The blower 436 may be disposed in the upward direction 432 with respect to the subassembly sheet 410. The fluid 434 may be a gaseous fluid, such as air. However, the fluid 434 may additionally or alternatively include an inert gas, such as argon, nitrogen, or combinations thereof, by way of non-limiting example.

The blower 436 may be configured to deliver the fluid 434 such that the fluid has a laminar flow. The use of a laminar flow may facilitate the formation of a smooth electrode ink surface 440 with minimal variation in thickness, reduce or eliminate damage to the pre-layer 422, and facilitate rapid coating of a large area of the surface 426. A second portion 442 of the electrode ink 424 remains on the subassembly sheet 410 to form a reference electrode precursor layer 444. The reference electrode precursor layer 444 may have a precursor thickness 446 that is less than the initial thickness 428.

In certain aspects, the blower 436 may include an air knife. However, other types of blowers 436 may also be employed. In certain aspects, the blower 436 is configured to deliver the fluid 434 at a first angle 448 with respect to the subassembly sheet 410. The first angle 448 may be an oblique angle. The blower 436 may generally direct the fluid 434 in a vector having components in a third or downward direction 450 opposite the upward direction 432 and a fourth or reverse direction 452 opposite the conveyance direction 412. The first angle 448 may be greater than 90° to less than or equal to about 100°, greater than or equal to about 100° to less than or equal to about 110°, greater than or equal to about 110° to less than or equal to about 120°, greater than or equal to about 120° to less than or equal to about 130°, greater than or equal to about 130° to less than or equal to about 140°, greater than or equal to about 140° to less than or equal to about 150°, greater than or equal to about 150° to less than or equal to about 160°, greater than or equal to about 160° to less than or equal to about 170°, or greater than or equal to about 170° to less than 180°, for example.

The method may further include collecting at least a portion of the first portion 438 of the electrode ink 424. The first portion 438 of electrode ink 424 may be collected by an ink vacuum 456 and/or an ink collection tray 458. The ink vacuum 456 may be disposed in the upward direction 432 with respect to the subassembly sheet 410. The ink vacuum 456 may be configured to move the first portion 438 of electrode ink 424 at a second angle 460. The first portion 438 of the electrode ink 424 may travel in a vector having components in the upward direction 432 and the reverse direction 452. The second angle 460 may be an oblique angle. In certain aspects, the second angle 460 vector may be a reflection of the first angle 448 vector about a plane 462 substantially parallel to the upward and downward directions 432, 450. In certain aspects, the ink vacuum 456 may be an exhaust system or a vacuum pump, by way of non-limiting example.

The ink tray 458 may be disposed in the downward direction 450 with respect to the subassembly sheet 410. At least a portion of the ink tray 458 may be disposed under the blower 436. The ink tray 458 may include an interior area in which the first portion 438 of the electrode ink 424 may be collected.

In certain aspects, the first portion 438 of the electrode ink 424 can be recycled and reused. Therefore, the ink vacuum 456 and/or the ink tray 458 may be fluidly connected to the ink dispenser 430, such as by first and second ink conduits 464, 466, respectively. The electrode ink 424 may be conveyed from the ink vacuum 456 and/or ink tray 458 to the ink dispenser 430 via first and second pumps 468, 470, respectively.

In various aspects, properties of the reference electrode precursor layer 444 may be controlled by modifying a composition of the electrode ink 424 (e.g., modifying an amount of solvent to affect porosity, initial thickness 428, or precursor thickness 446), a speed of subassembly sheet 410 in the conveyance direction 412 (e.g., decreasing a speed to increase the initial thickness 428), a flow rate or the first angle 448 of the blower 436 (e.g., to modify the precursor thickness 446 or uniformity of thickness), a flow rate or the second angle 460 of the ink vacuum 456, by way of non-limiting example. The method may be particularly suitable for large-scale manufacturing. For example, a roll-to-roll manufacturing process may be employed. The process may be performed continuously.

(b) Creating a Reference Electrode Precursor Via Spin Coating

Figure 12B:
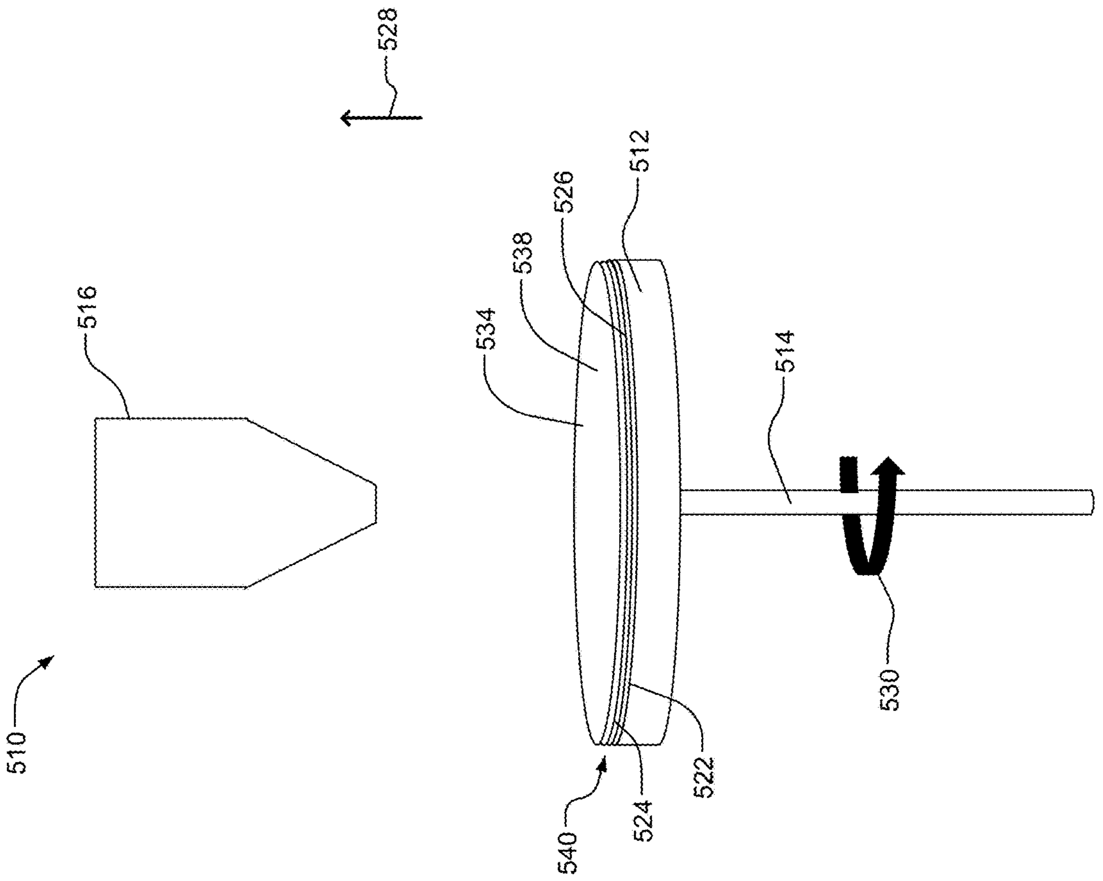
FIGS. 12A-12B are perspective views of a method of making a reference electrode assembly using spin coating.
Figure 12A:
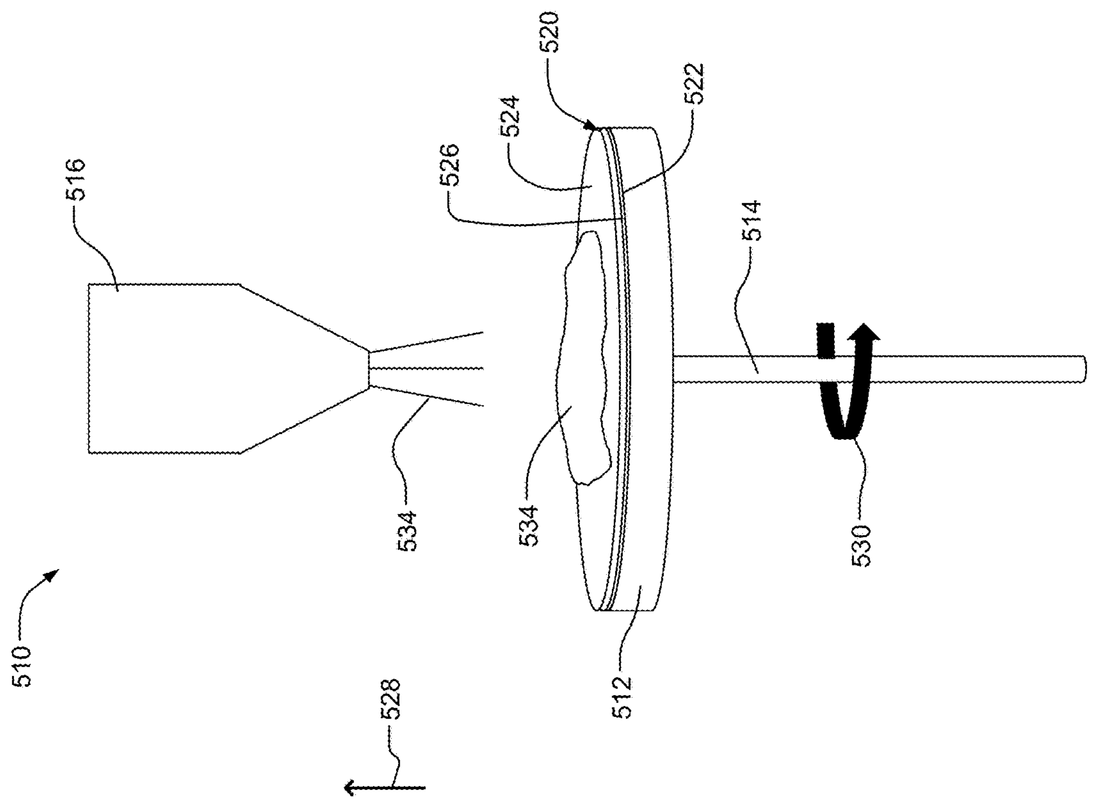

In certain aspects, forming a reference electrode precursor, such as the reference electrode precursor 362 of FIGS. 9A-9B or the reference electrode precursor 362' of FIG. 10, may include a spin coating method. With reference to FIGS. 12A-12B, a system 510 for forming a reference electrode precursor via spin coating according to various aspects of the present disclosure is provided. The system 510 may generally include a disk 512 coupled to an axle 514 and an ink dispenser 516.

The method may include placing a subassembly 520 including a separator layer 522 and a current collector layer 524 on a disk surface 526 such that the current collector layer 524 is disposed in a first or upward direction 528 with respect to the separator layer 522. The method may further include dispensing a predetermined amount of electrode ink 534 onto the current collector layer 524 from the ink dispenser 516. The method may further include rotating the disk 512 in a rotational direction 530 at a rotational speed. The rotational speed may be greater than or equal to about 500 revolutions per minute (RPM) to less than or equal to about 3,000 RPM, optionally greater than or equal to about 500 RPM to less than or equal to about 2,000 RPM, or optionally greater than or equal to about 500 RPM to less than or equal to about 1,000 RPM. In various alternative aspects, the method may include rotating the disk 512 prior to dispensing the electrode ink 534.

As the disk rotates, the electrode ink 534 spreads across the current collector layer 524 to form a reference electrode precursor layer 538. The separator layer 522, the current collector layer 524, and the reference electrode precursor layer 538 may be collectively referred to as the reference electrode precursor 540. The reference electrode precursor layer 538 may have a substantially uniform thickness. In certain aspects, the reference electrode precursor layer 538 may cover substantially an entire superficial surface area of the current collector layer 524. At least some of the electrode ink 534 may be forced off of the disk 512 during rotation. Excess electrode ink 534 may be collected and recycled to the ink dispenser 516, such as via an ink tray, conduit, and pump arrangement (see, e.g., the ink collection tray 458, the second ink conduit 466, and the second pump 470 of FIG. 11).

In various aspects, properties of the reference electrode precursor layer 538 may be controlled by modifying a composition of the electrode ink 534 (e.g., modifying an amount of solvent to affect porosity, dispensing, or thickness of the reference electrode precursor layer) and/or the rotational speed (e.g., decreasing a speed to increase the thickness), by way of non-limiting example.

Creating a Reference Electrode Assembly

Returning to FIG. 5, at 256, the method may further include creating a reference electrode assembly by drying a reference electrode precursor layer. Drying the reference electrode precursor layer (e.g., electrode ink layer 360 of FIGS. 9A-9B, electrode ink layer 360' of FIG. 10, reference electrode precursor layer 444 of FIG. 11, or reference electrode precursor layer 538 of FIGS. 12A-12B) may include removing at least a portion of the solvent from the electrode ink. In certain aspects, drying may include removing substantially all of the solvent from the electrode ink to form an electroactive layer. Drying may be conducted at ambient temperature, or above-ambient temperature (e.g., by circulation of heated air or in an oven). In the laminar air flow method of FIG. 11, drying may be performed by the blower 436, with ambient air or heated air, by way of example. In the spin-coating method of FIGS. 12A-12B, drying may be performed due to relative motion of the electrode ink 534 and surrounding air.

Removing a Portion of an Electroactive Layer

With continued reference to FIG. 5, at 260, the method may further include removing a portion of an electroactive layer to form reference electrode tabs. Step 260 may be performed prior to step 256, concurrently with step 256, or after step 256. In one example, such as for the electrode precursor 362 of FIGS. 9A-9B, removing a portion of the electroactive layer includes removing the mask layer 340. In another example, such as for the electrode precursor 362' of FIG. 10, removing a portion of the electroactive layer includes applying a solvent to the electroactive layer in a first region. In certain aspects, a binder of the electrode ink is water-soluble and the solvent includes water.

Figure 13B:
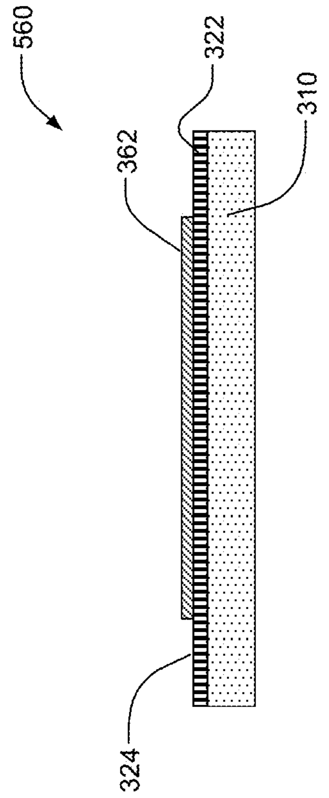
FIGS. 13A-13B depict a reference electrode assembly formed from the reference electrode precursor of FIGS. 9A-9B.
Figure 13A:
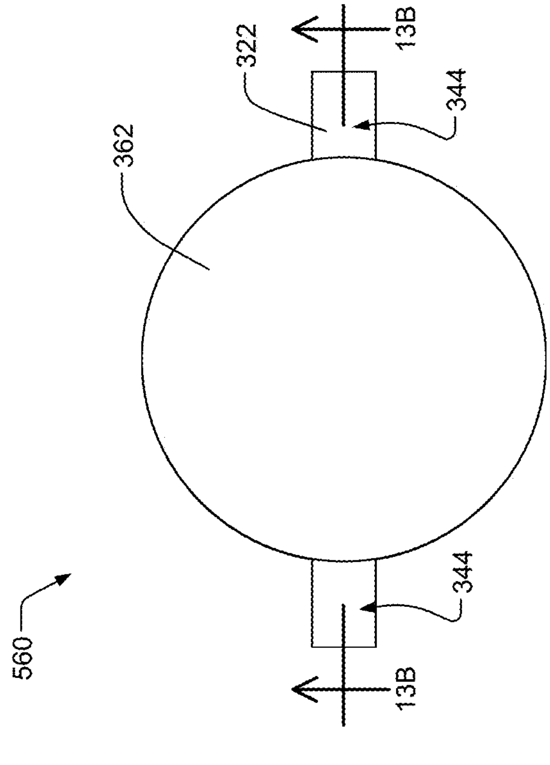

With reference to FIGS. 13A-13B, a reference electrode assembly 560 according to various aspects of the present disclosure is provided. The reference electrode assembly 560 includes the separator layer 310, the current collector layer 322, and an electroactive layer 562. The electroactive layer 562 is disposed on the third surface 324 of the current collector layer 322.

Subdividing the Reference Electrode Assembly

Returning to FIG. 5, at 264, the method may optionally include sub-dividing the reference electrode assembly to form a plurality of reference electrode assemblies. Step 264 may be included, for example, when the reference electrode assembly is manufactured in a large scale manufacturing process, such as the laminar air flow method of FIG. 11. The reference electrode assembly may be subdivided via mechanical cutting (e.g., die cutting), laser cutting, or combinations thereof, by way of non-limiting example.

Assembling a Three Electrode Cell

In various aspects, at 268, the method may optionally include assembling a three-electrode cell, such as the electrochemical device 110 of FIG. 2, a coin cell including the electrode stack 180 of FIG. 3, or the three-electrode pouch cell 220 of FIG. 4. The cell may be assembled according to methods known in the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a reference electrode assembly for an electrochemical cell, the method comprising:

providing a subassembly comprising a separator layer and a current collector layer coupled to the separator layer, the separator layer being porous and electrically insulating, the current collector layer being electrically conductive;

providing an electrode ink comprising an electroactive material, a binder, and a solvent;

creating a reference electrode precursor by applying an electroactive precursor layer to the current collector layer of the subassembly, the electroactive precursor layer covering greater than or equal to about 90% of a superficial surface area of a surface of the current collector layer, the electroactive precursor layer comprising the electrode ink; and creating the reference electrode assembly by drying the electroactive precursor layer to remove at least a portion of the solvent, thereby forming an electroactive layer, the electroactive layer being solid and porous, wherein the creating the reference electrode precursor comprises:

conveying the subassembly in a direction;

applying the electrode ink to the surface such that the electrode ink has a first thickness; and forming the electroactive precursor layer by directing a fluid at the electrode ink to displace a first portion of the electrode ink, the fluid having a laminar flow, the electroactive precursor layer comprising a second portion of the electrode ink and having a second thickness less than the first thickness.

2. The method of claim 1, further comprising collecting the first portion of the electrode ink.

3. The method of claim 2, wherein the collecting comprises receiving at least a portion of the first portion of the electrode ink in an ink tray disposed on a side of the subassembly opposite the second portion of the electrode ink.

4. The method of claim 2, wherein the collecting comprises receiving at least a portion of the first portion of the electrode ink in a vacuum.

5. The method of claim 1, wherein the applying the electrode ink comprises additive manufacturing.

6. The method of claim 1, wherein the fluid comprises air.

7. The method of claim 1, wherein the electroactive layer defines a thickness of greater than or equal to about 0.2 μm to less than or equal to about 1 μm.

8. The method of claim 1, wherein the electroactive precursor layer covers substantially the entire superficial surface area.

9. The method of claim 1, wherein the electroactive layer defines a first porosity of greater than or equal to about 40% to less than or equal to about 60%.

10. The method of claim 1, wherein the providing the subassembly comprises sputtering the current collector layer onto the separator layer.

11. The method of claim 1, wherein the current collector layer defines a thickness of greater than or equal to about 25 nm to less than or equal to about 100 nm.

12. The method of claim 1, wherein:

the providing the electrode ink comprises preparing the electrode ink by admixing the electroactive material, the binder, and the solvent;

the solvent is present in an amount greater than or equal to about 80% by weight to less than or equal to about 99% by weight; and the electroactive material is in a form of a plurality of particles.

13. The method of claim 1, further comprising:

applying a mask layer to a region of the surface after providing the subassembly and prior to the creating the reference electrode precursor; and creating a tab by removing the mask layer after the creating the reference electrode precursor.

14. The method of claim 1, further comprising creating a tab by removing a portion of the electrode ink in a region of the surface by applying a solvent to the electrode ink.

15. The method of claim 14, wherein the solvent comprises water.

* * * * *